US012344004B2

(12) United States Patent
Sawadaishi

(10) Patent No.: US 12,344,004 B2
(45) Date of Patent: Jul. 1, 2025

(54) FLOW PATH SWITCHING UNIT AND LIQUID EJECTING DEVICE

(71) Applicant: SEIKO EPSON CORPORATION, Tokyo (JP)

(72) Inventor: Makoto Sawadaishi, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 293 days.

(21) Appl. No.: 18/069,377

(22) Filed: Dec. 21, 2022

(65) Prior Publication Data

US 2023/0202189 A1 Jun. 29, 2023

(30) Foreign Application Priority Data

Dec. 24, 2021 (JP) ................................ 2021-210448

(51) Int. Cl.
*B41J 2/175* (2006.01)

(52) U.S. Cl.
CPC ... *B41J 2/17596* (2013.01); *B01L 2400/0622* (2013.01); *B01L 2400/0644* (2013.01)

(58) Field of Classification Search
CPC .. B41J 2/175; F16K 11/02; F16K 3/26; F16K 99/0013; F04B 43/073; B01L 2400/0644
See application file for complete search history.

(56) References Cited

U.S. PATENT DOCUMENTS 3,586,049 A * 6/1971 Adamson ............ F16K 11/0856 137/625.41
4,285,644 A * 8/1981 Takalo ...................... F01C 3/02 418/196
6,119,726 A * 9/2000 Cox ...................... F16K 11/078 137/239
7,717,131 B2 * 5/2010 Creswell ................... F16K 3/10 239/394
2005/0195246 A1 9/2005 Ogawa
2006/0152563 A1 * 7/2006 Kumagai ............. B41J 2/17596 347/86
2007/0028971 A1 * 2/2007 Wagner .............. B01D 53/0446 137/625.15
2010/0116270 A1 * 5/2010 Edwards ............... A61M 16/12 128/204.26

(Continued)

FOREIGN PATENT DOCUMENTS

JP 2005-246928 A 9/2015

*Primary Examiner* — John Zimmermann
(74) *Attorney, Agent, or Firm* — WORKMAN NYDEGGER

(57) ABSTRACT

A flow path switching unit includes a rotary valve configured to rotate, a housing including a contact surface with which the rotary valve comes into contact, and a pressing member configured to press the rotary valve against the contact surface. The housing includes a first flow path that opens to the contact surface, a second flow path that opens to the contact surface, and a third flow path that opens to the contact surface. The rotary valve includes an elastic portion configured to come into contact with the contact surface and including a recessed portion facing the contact surface. The rotary valve is configured to switch between a state in which the recessed portion faces the first flow path and the second flow path, and a state in which the recessed portion faces the first flow path and the third flow path by rotation of the rotary valve.

12 Claims, 14 Drawing Sheets

(56) References Cited

U.S. PATENT DOCUMENTS

| | | | | |
|---|---|---|---|---|
| 2011/0279581 | A1* | 11/2011 | Rosati | B41J 2/17506 347/85 |
| 2015/0101693 | A1* | 4/2015 | Enomoto | F16K 31/535 137/597 |
| 2015/0125318 | A1* | 5/2015 | Tetzlaff | F04B 43/067 417/388 |
| 2015/0259940 | A1* | 9/2015 | Renaud | E04H 4/1672 15/1.7 |
| 2017/0328924 | A1* | 11/2017 | Jones | G01N 1/312 |
| 2018/0017175 | A1* | 1/2018 | Liang | F16K 39/045 |
| 2018/0257620 | A1* | 9/2018 | Crossman | B60T 8/4031 |
| 2019/0249799 | A1* | 8/2019 | Cauley, III | B01L 3/502738 |
| 2022/0388000 | A1* | 12/2022 | Lai | B01L 3/502707 |

* cited by examiner

FLOW PATH SWITCHING UNIT AND LIQUID EJECTING DEVICE

The present application is based on, and claims priority from JP Application Serial Number 2021-210448, filed Dec. 24, 2021, the disclosure of which is hereby incorporated by reference herein in its entirety.

BACKGROUND

1. Technical Field

The present disclosure relates to a liquid ejecting device.

2. Related Art

JP-A-2005-246928 describes a flow path switching unit including a rotary valve that rotates and a housing that comes into contact with the rotary valve. This flow path switching unit is configured to switch a flow path by rotation of the rotary valve relative to the housing. The rotary valve and the housing are sealed by an outer peripheral surface of the rotary valve coming into contact with the housing.

In the flow path switching unit described in JP-A-2005-246928, the outer peripheral surface of the rotary valve may wear due to the rotation of the rotary valve. When the outer peripheral surface of the rotary valve wears, sealing properties between the rotary valve and the housing may deteriorate. In this case, it is difficult to appropriately switch the flow path.

SUMMARY

A flow path switching unit for solving the problems described above includes a rotary valve configured to rotate, a housing including a contact surface with which the rotary valve comes into contact, and a pressing member configured to press the rotary valve against the contact surface. The housing includes a first flow path that opens to the contact surface, a second flow path that opens to the contact surface, and a third flow path that opens to the contact surface. The rotary valve includes an elastic portion configured to come into contact with the contact surface and including a recessed portion facing the contact surface. The rotary valve is configured to switch between a state in which the recessed portion faces the first flow path and the second flow path, and a state in which the recessed portion faces the first flow path and the third flow path by rotation of the rotary valve.

A liquid ejecting device for solving the problems described above includes a head including a nozzle configured to eject a liquid, a supply flow path for supplying the liquid from a supply source to the head, a cap configured to cover the nozzle by coming into contact with the head, a suction pump, and the flow path switching unit described above. The first flow path is coupled to the suction pump, the second flow path is coupled to the cap, and the third flow path is coupled to the supply flow path.

DESCRIPTION OF EXEMPLARY EMBODIMENTS

An exemplary embodiment of a liquid ejecting device including a flow path switching unit will be described below with reference to the drawings. The liquid ejecting device is, for example, an ink jet-type printer that records an image such as characters and photographs on a medium such as a sheet or fabric by ejecting ink, which is an example of a liquid.

Figure 1:
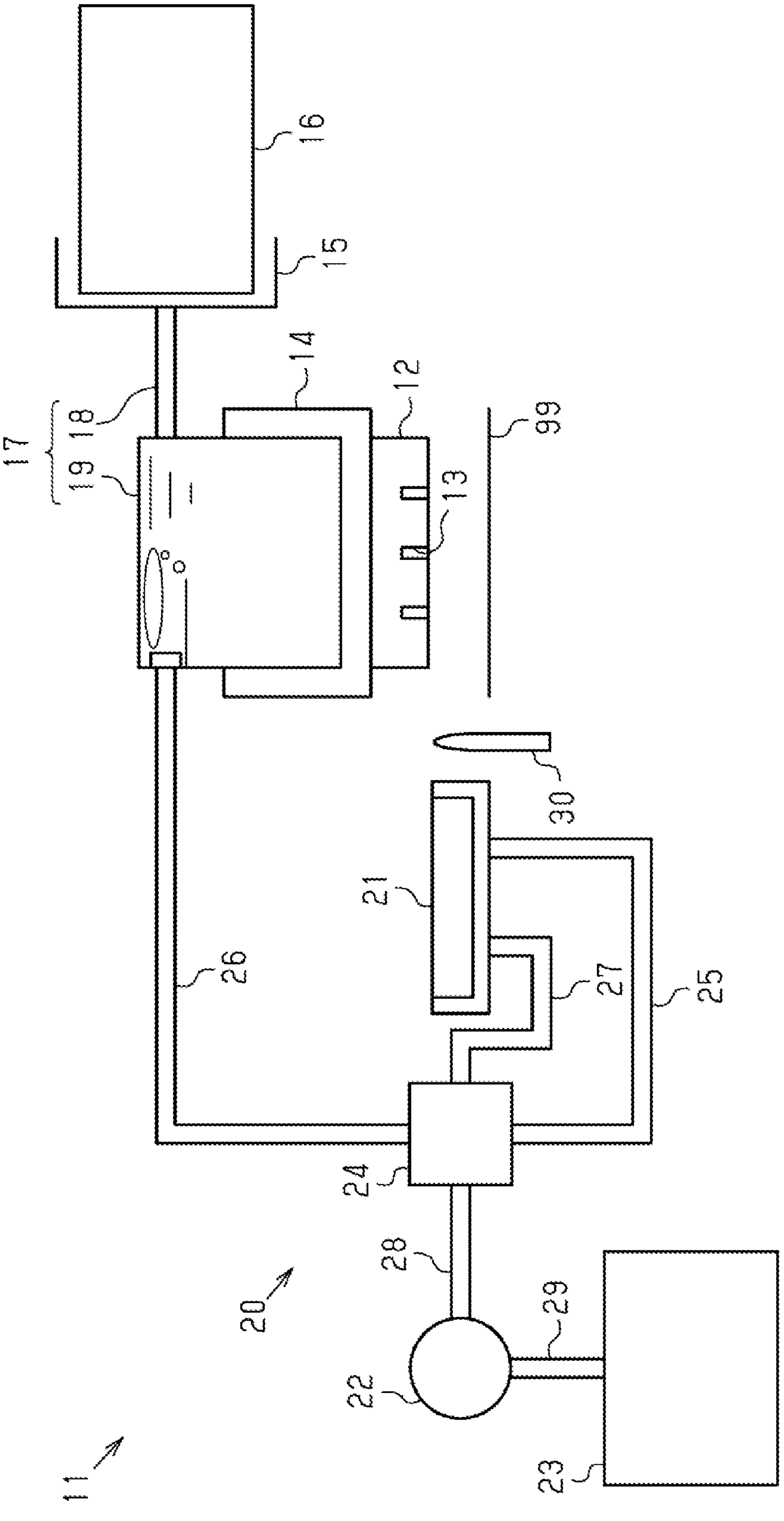
FIG. 1 is a schematic view of a liquid ejecting device including a flow path switching unit.

As illustrated in FIG. 1, a liquid ejecting device 11 includes a head 12. The head 12 is configured to eject a liquid. The head 12 includes a nozzle 13. The nozzle 13 ejects the liquid. The head 12 records an image on a medium 99 by ejecting the liquid onto the medium 99 from the nozzle 13.

The liquid ejecting device 11 includes a carriage 14. The carriage 14 is equipped with the head 12. The carriage 14 is configured to scan the medium 99. Therefore, the liquid ejecting device 11 of this example is a serial-type printer. The liquid ejecting device 11 may be a line-type printer capable of ejecting liquid at once across a width of the medium 99.

The liquid ejecting device 11 includes a mounting portion 15. The mounting portion 15 is configured to mount a supply source 16. The supply source 16 accommodates the liquid. The supply source 16 is, for example, an ink tank or an ink cartridge.

The liquid ejecting device 11 includes a supply flow path 17. The supply flow path 17 is a flow path for supplying the liquid from the supply source 16 to the head 12. The supply flow path 17 is coupled to the mounting portion 15 and the head 12. The supply source 16 is mounted to the mounting portion 15, coupling the supply source 16 to the supply flow path 17.

The supply flow path 17 includes a supply pipe 18 and a storage unit 19.

The supply pipe 18 is coupled to the mounting portion 15 and the storage unit 19. That is, the supply pipe 18 is coupled to the supply source 16 and the storage unit 19. The liquid is supplied from the supply source 16 to the storage unit 19 through the supply pipe 18. The supply pipe 18 is, for example, a tube.

The storage unit 19 is configured to store the liquid. The storage unit 19 is coupled to the head 12. The liquid stored in the storage unit 19 is supplied to the head 12. The storage unit 19 is mounted on the carriage 14. Air bubbles may be included in the liquid supplied from the supply source 16 to the storage unit 19. Therefore, air bubbles may accumulate at an upper portion of the storage unit 19.

The liquid ejecting device 11 includes a maintenance unit 20. The maintenance unit 20 is a unit for maintaining the liquid ejecting device 11.

The maintenance unit 20 includes a cap 21. The cap 21 is configured to come into contact with the head 12. The cap 21 covers the nozzle 13 by coming into contacting with the head 12. As a result, a space that communicates with the nozzle 13 is formed in an interior of the cap 21. The cap 21 covers the nozzle 13, thereby suppressing drying of the nozzle 13.

The cap 21 is configured to change in position between a position that comes into contact with the head 12 and a position that does not come into contact with the head 12. The cap 21 is configured to be vertically movable, for example. The cap 21 comes into contact with the head 12 by moving upward while facing the head 12.

The maintenance unit 20 includes a suction pump 22.

The suction pump 22 is coupled to the cap 21 and the supply flow path 17. The suction pump 22 suctions the interior of the cap 21 and an interior of the supply flow path 17. In particular, the suction pump 22 is coupled to the cap 21 and the storage unit 19. The suction pump 22 suctions the interior of cap 21 and the interior of the storage unit 19.

The suction pump 22, by suctioning the interior of the cap 21, suctions the liquid from the cap 21. For example, when the suction pump 22 suctions the interior of the cap 21 while the cap 21 is in contact with the head 12, covering the nozzle 13, a negative pressure in the cap 21 acts on the nozzle 13, and thickened liquid, solidified liquid, or the like is discharged from the nozzle 13. That is, the maintenance unit 20 cleans the head 12. The suction pump 22, by suctioning the interior of the storage unit 19, suctions air bubbles that accumulate in the storage unit 19. As a result, air bubbles are discharged from the storage unit 19.

The maintenance unit 20 includes an accommodation unit 23. The accommodation unit 23 is coupled to the suction pump 22. The liquid and the air bubbles suctioned by the suction pump 22 from the cap 21 and the supply flow path 17 are discharged into the accommodation unit 23. The accommodation unit 23 accommodates waste liquid produced by the maintenance.

The maintenance unit 20 includes a flow path switching unit 24. The flow path switching unit 24 is positioned between the cap 21 and the suction pump 22 in the maintenance unit 20. The flow path switching unit 24 switches a coupling destination of a flow path, for example. The flow path switching unit 24, by switching the coupling destination of the flow path, switches the coupling destination of the suction pump 22 between the cap 21 and the supply flow path 17, for example. The flow path switching unit 24, by switching the coupling destination of the flow path, switches between a state in which the interior of the cap 21 is open to the atmosphere and a state in which the interior of the cap 21 is not open to the atmosphere, when the cap 21 is in contact with the head 12, for example.

The maintenance unit 20 includes a suction pipe 25. The suction pipe 25 is coupled to the cap 21 and the flow path switching unit 24. The suction pipe 25 is a pipe for coupling the cap 21 and the suction pump 22. The suction pipe 25 is, for example, a tube.

The maintenance unit 20 includes an exhaust pipe 26. The exhaust pipe 26 is coupled to the supply flow path 17 and the flow path switching unit 24. Specifically, the exhaust pipe 26 is coupled to the storage unit 19 and the flow path switching unit 24. The exhaust pipe 26 is a pipe for coupling the supply flow path 17 and the suction pump 22. The exhaust pipe 26 is, for example, a tube.

The maintenance unit 20 includes an open pipe 27. The open pipe 27 is coupled to the cap 21 and the flow path switching unit 24. The open pipe 27 is a pipe for opening the interior of the cap 21 to the atmosphere. The open pipe 27 is, for example, a tube.

The flow path switching unit 24, by switching the coupling destination of the flow path, switches the coupling destination of the open pipe 27. The flow path switching unit 24 switches the coupling destination of the open pipe 27, thereby switching between a state in which the open pipe 27 communicates with the atmosphere, and a state in which the open pipe 27 does not communicate with the atmosphere. With the open pipe 27 in communication with the atmosphere when the cap 21 is in contact with the head 12, the interior of the cap 21 is open to the atmosphere. With the open pipe 27 not in communication with the atmosphere when the cap 21 is in contact with the head 12, the interior of the cap 21 is not open to the atmosphere, that is, the interior of the cap 21 is sealed.

When the suction pump 22 suctions the interior of the cap 21 with the interior of the cap 21 sealed, the head 12 is cleaned. When the suction pump 22 suctions the interior of the cap 21 with the interior of the cap 21 open to the atmosphere, the liquid in the cap 21 and the liquid in the suction pipe 25 are suctioned. That is, the maintenance unit 20 executes an idle suction of the interior of the cap 21. The idle suction is executed, for example, after cleaning. As a result, the liquid discharged by the cleaning is discharged from the cap 21 and the suction pipe 25. The idle suction is implemented with the cap 21 in contact with the head 12, thereby reducing the risk of liquid being scattered by the idle suction. Further, with the interior of the cap 21 open to the atmosphere through the open pipe 27, the liquid is less likely to flow back into the cap 21 as compared to when the idle suction is executed with the interior of the cap 21 open to the atmosphere through the suction pipe 25. Note that, even by the suction pump 22 sectioning the interior of the cap 21 with the cap 21 not in contact with the head 12, the maintenance unit 20 implements the idle suction.

The maintenance unit 20 includes a coupling pipe 28. The coupling pipe 28 is coupled to the suction pump 22 and the flow path switching unit 24. The coupling pipe 28 is, for example, a tube. The flow path switching unit 24, by switching the coupling destination of the flow path, switches the coupling destination of the coupling pipe 28. Specifically, the flow path switching unit 24 switches the coupling destination of the coupling pipe 28 between the suction pipe 25 and the exhaust pipe 26. When the coupling pipe 28 is coupled to the suction pipe 25, the suction pump 22 and the cap 21 are in communication. When the coupling pipe 28 is coupled to the exhaust pipe 26, the suction pump 22 and the supply flow path 17 are in communication. The flow path switching unit 24 switching the coupling destination of the coupling pipe 28 switches a suction target of the suction pump 22.

The maintenance unit 20 includes a discharge pipe 29. The discharge pipe 29 is coupled to the suction pump 22 and the accommodation unit 23. The discharge pipe 29 is, for example, a tube.

The maintenance unit 20 includes a wiper 30. The wiper 30 is configured to wipe the head 12. Specifically, the wiper 30 wipes a surface of the head 12 to which the nozzle 13 opens.

The wiper 30 is configured to change in position between a position that comes into contact with the head 12 and a position that does not come into contact with the head 12. The wiper 30 is configured to be vertically movable, for example. The wiper 30 comes into contact with the head 12 facing the wiper 30 by moving upward. The wiper 30 wipes the head 12 by, for example, the head 12 moving relative to the wiper 30 in contact with the head 12. As a result, liquid, foreign material, and the like adhering to the head 12 are removed. That is, the maintenance unit 20 wipes off the head 12. Wiping is implemented, for example, after the cleaning or after the idle suction. This is because liquid readily adheres to the head 12 when the cleaning or the idle suction is implemented. In this way, the maintenance unit 20 maintains the liquid ejecting device 11 by implementing cleaning, idle suction, wiping, and the like.

Next, the flow path switching unit 24 will be described.

Figure 2:
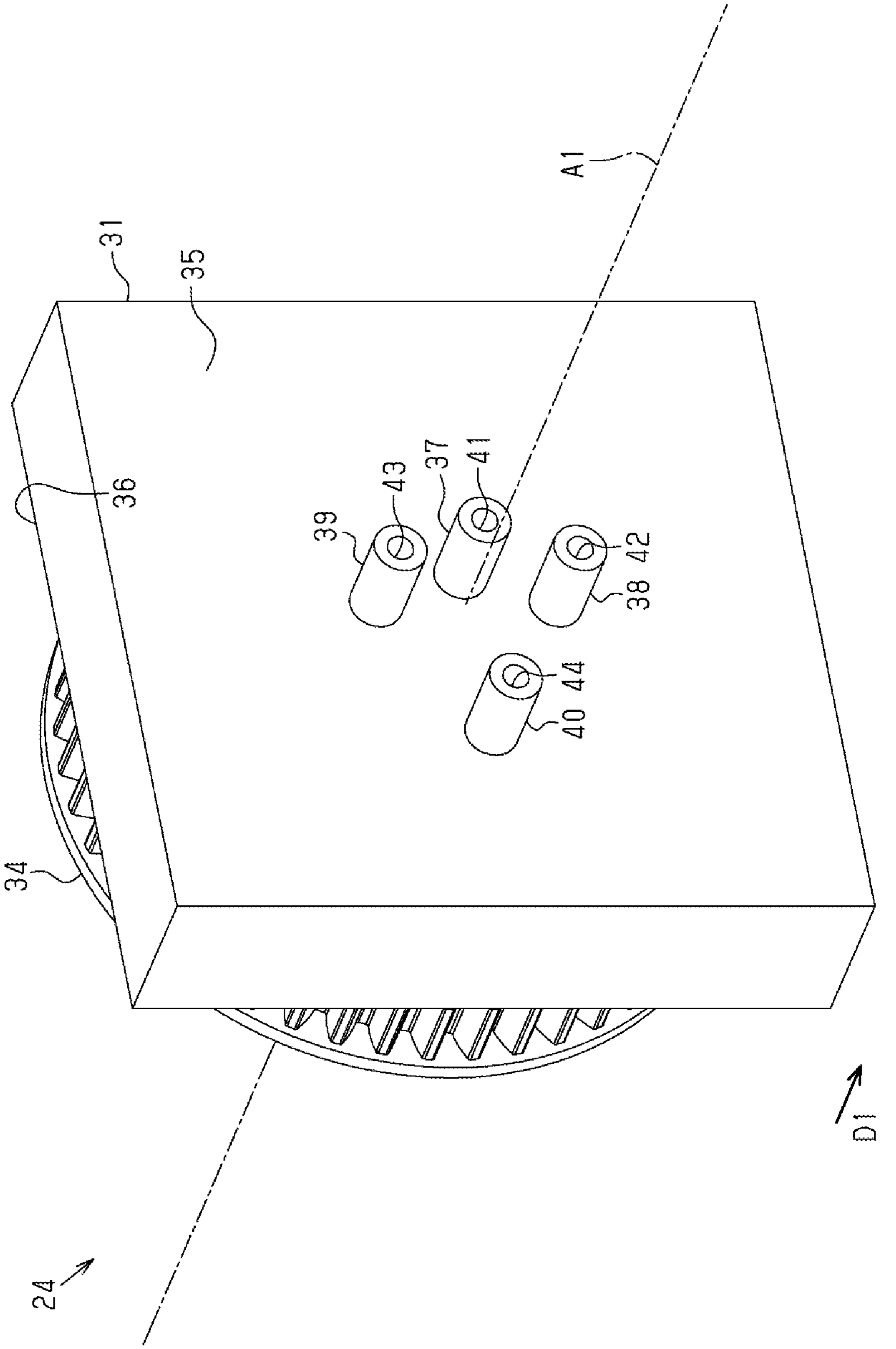
FIG. 2 is a perspective view of the flow path switching unit.
Figure 3:
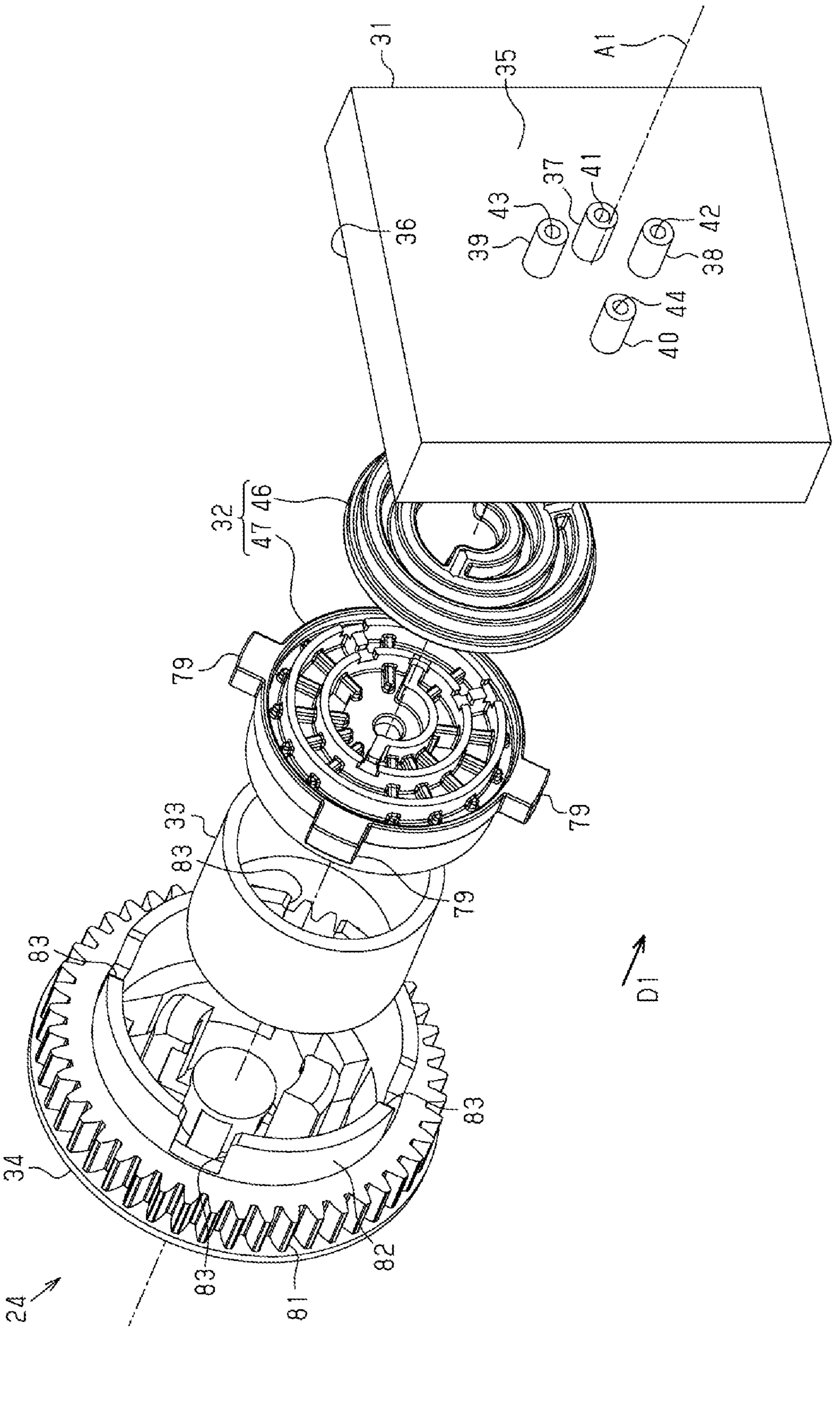
FIG. 3 is an exploded perspective view of the flow path switching unit.

As illustrated in FIGS. 2 and 3, the flow path switching unit 24 includes a housing 31. The flow path switching unit 24 includes a rotary valve 32. The flow path switching unit 24 includes a pressing member 33. The flow path switching unit 24 includes a toothed drive gear 34. The rotary valve 32, the pressing member 33, and the toothed drive gear 34 rotate relative to housing 31. The rotary valve 32, the pressing member 33, and the toothed drive gear 34 rotate about a rotation axis A1. The rotation axis A1 is an imaginary axis. The toothed drive gear 34, the pressing member 33, the rotary valve 32, and the housing 31 are aligned in an axial direction D1, in this order. The axial direction D1 is a direction in which the rotation axis A1 extends.

The housing 31 includes a coupling surface 35 and a contact surface 36. The coupling surface 35 and the contact surface 36 face each other in the housing 31. Specifically, the coupling surface 35 and the contact surface 36 face each other in the axial direction D1. The contact surface 36 faces the rotary valve 32. The contact surface 36 comes into contact with the rotary valve 32.

Figure 4:
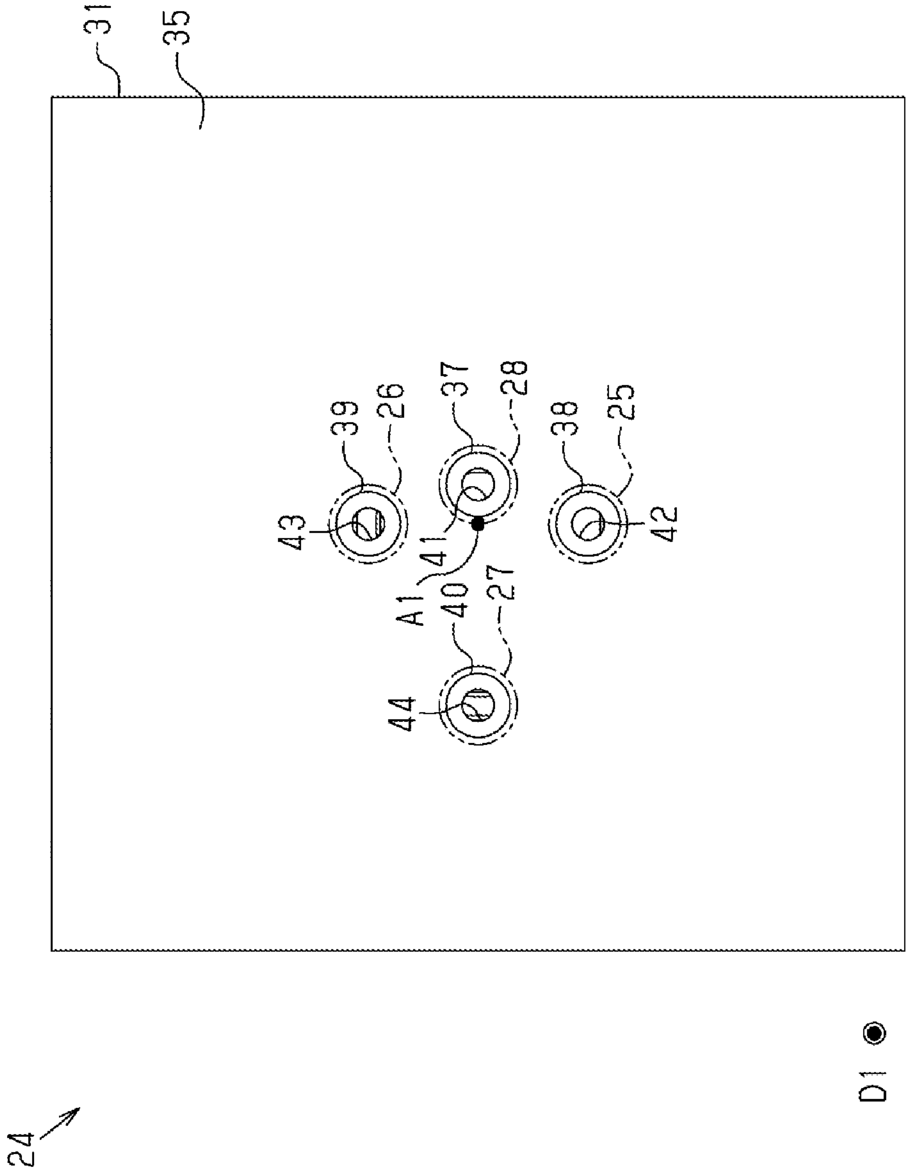
FIG. 4 is a front view of the flow path switching unit.

As illustrated in FIG. 4, the housing 31 includes a plurality of flow path tubes. The housing 31 includes, for example, a first flow path tube 37, a second flow path tube 38, a third flow path tube 39, and a fourth flow path tube 40. The first flow path tube 37, the second flow path tube 38, the third flow path tube 39, and the fourth flow path tube 40 extend from the coupling surface 35. The coupling pipe 28 is coupled to the first flow path tube 37. The suction pipe 25 is coupled to the second flow path tube 38. The exhaust pipe 26 is coupled to the third flow path tube 39. The open pipe 27 is coupled to the fourth flow path tube 40.

The housing 31 includes a plurality of flow paths. The housing 31 includes, for example, a first flow path 41, a second flow path 42, a third flow path 43, and a fourth flow path 44. The first flow path 41 opens to the first flow path tube 37. The second flow path 42 opens to the second flow path tube 38. The third flow path 43 opens to the third flow path tube 39. The fourth flow path 44 opens to the fourth flow path tube 40. The first flow path 41, the second flow path 42, the third flow path 43, and the fourth flow path 44 open to the contact surface 36. The first flow path 41, the second flow path 42, the third flow path 43, and the fourth flow path 44 pass through the housing 31. The first flow path 41 is coupled to the suction pump 22. The second flow path 42 is coupled to the cap 21. The third flow path 43 is coupled to the supply flow path 17, specifically, the storage unit 19. The fourth flow path 44 is coupled to the cap 21.

Among positions of the first flow path 41, the second flow path 42, the third flow path 43, and the fourth flow path 44, the first flow path 41 is, for example, at a position closest to the rotation axis A1 when viewed from the axial direction D1. The second flow path 42 and the third flow path 43 are positioned, for example, at positions point-symmetrical with respect to the rotation axis A1 when viewed from the axial direction D1. Among the positions of the first flow path 41, the second flow path 42, the third flow path 43, and the fourth flow path 44, the fourth flow path 44 is, for example, farthest from the rotation axis A1 when viewed from the axial direction D1.

Figure 5:
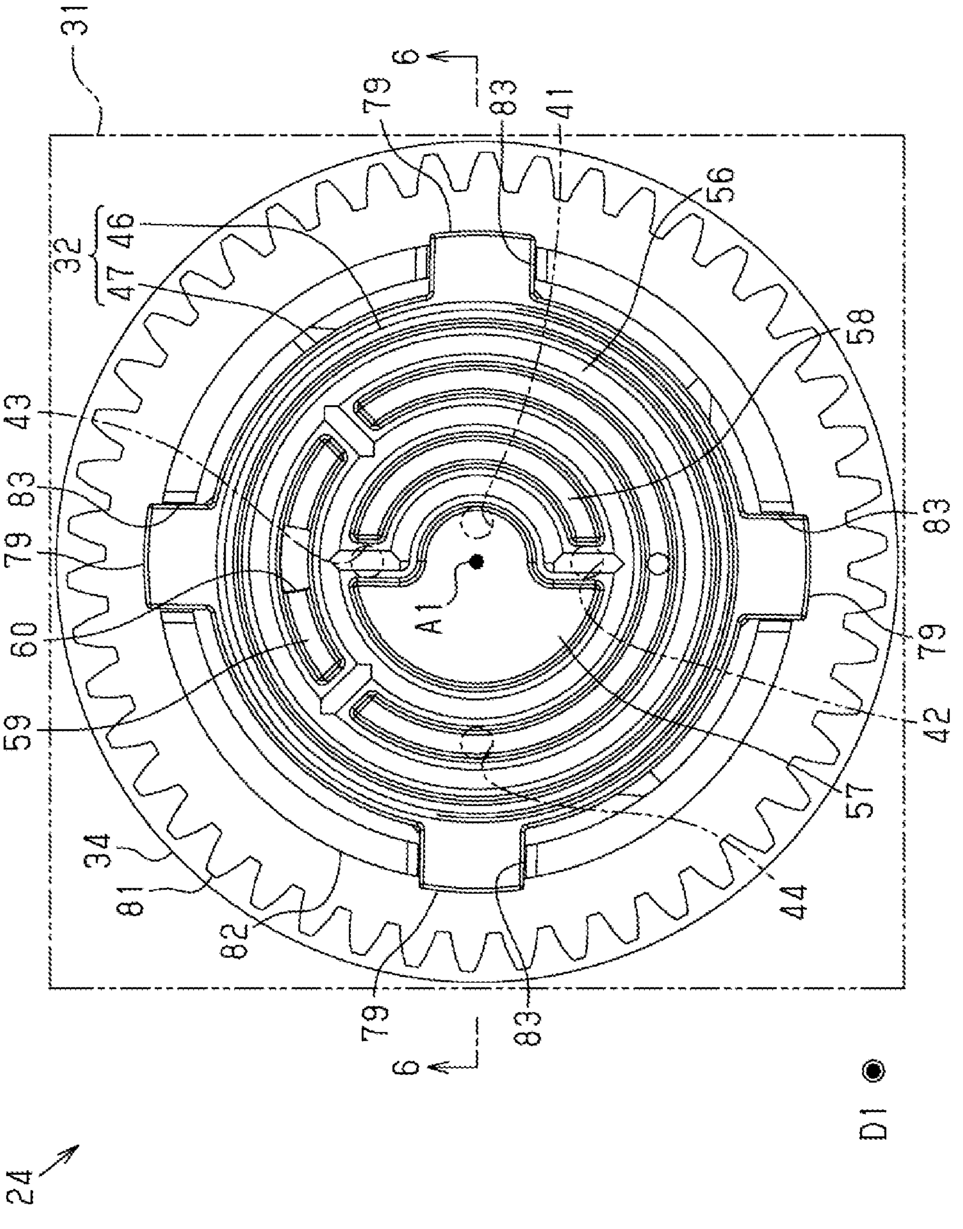
FIG. 5 is a front view of the flow path switching unit excluding a housing.

As illustrated in FIG. 5, the rotary valve 32 overlaps the housing 31 when viewed from the axial direction D1. The rotary valve 32 rotates while in contact with housing 31. The rotation of the rotary valve 32 switches the coupling destination of the flow path. Specifically, the rotation of the rotary valve 32 switches the coupling destination of the first flow path 41 between the second flow path 42 and the third flow path 43. The rotation of the rotary valve 32 switches the coupling destination of the fourth flow path 44.

The rotary valve 32 includes, for example, an elastic portion 46 and a base member 47. The rotary valve 32 may be the elastic portion 46 only.

Figure 6:
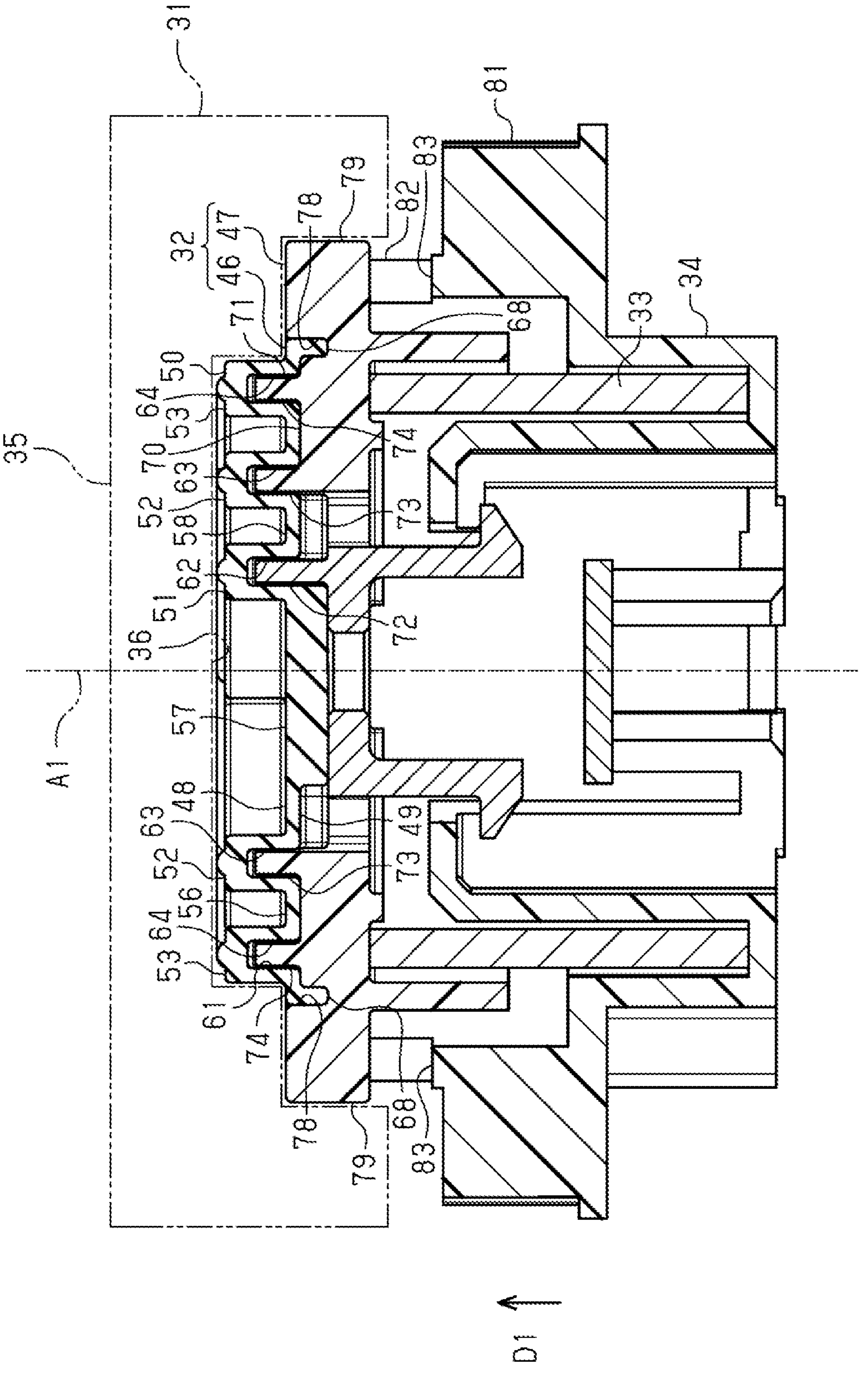
FIG. 6 is a cross-sectional view taken along line 6-6 in FIG. 5.
Figure 7:
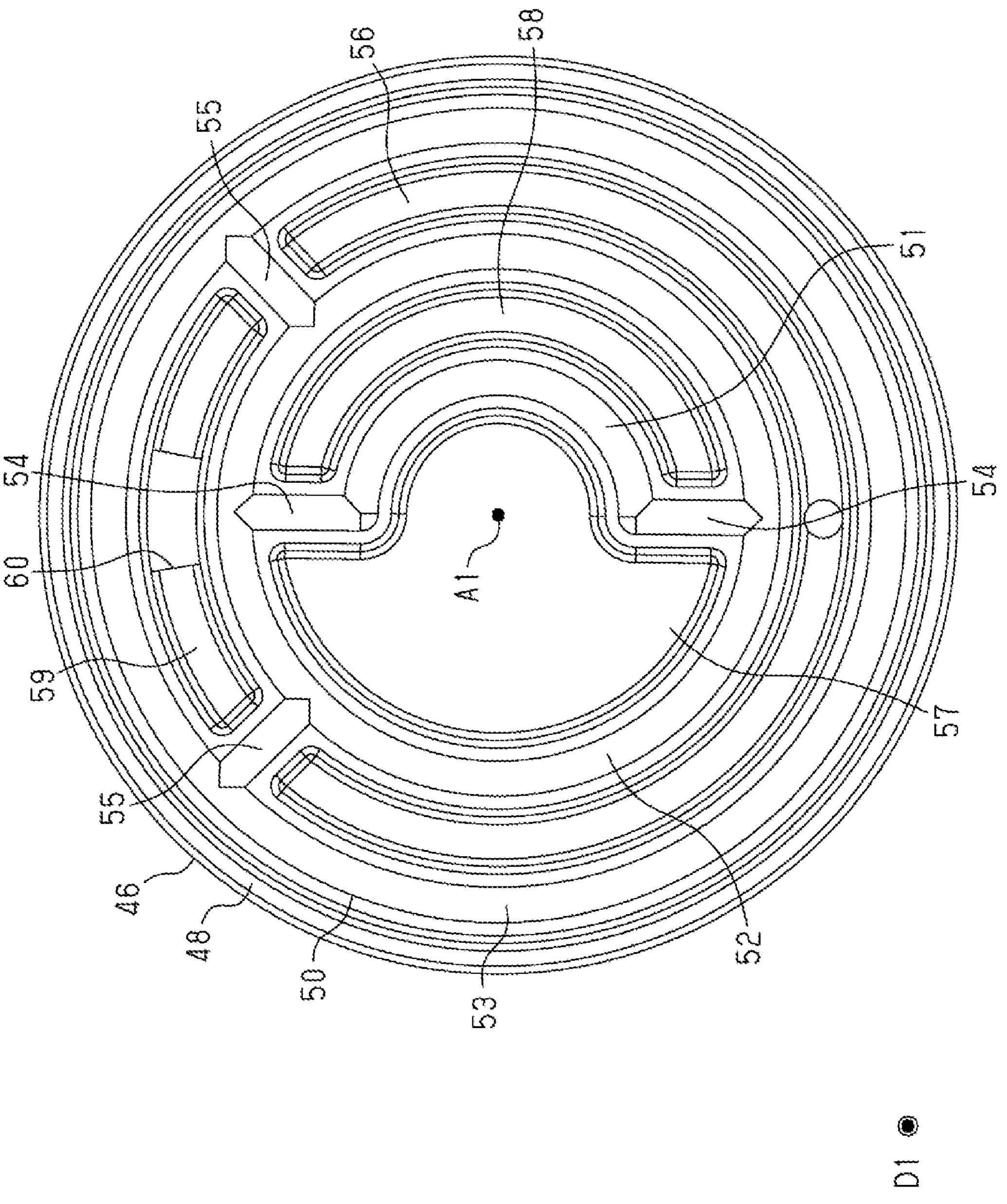
FIG. 7 is a front view of an elastic portion.

As illustrated in FIGS. 6 and 7, the elastic portion 46 is, for example, disk-shaped. The elastic portion 46 has elasticity. The elastic portion 46 is made of rubber or elastomer, for example. The elastic portion 46 comes into contact with the contact surface 36. The elastic portion 46 includes a facing surface 48 and an attachment surface 49. The facing surface 48 and the attachment surface 49 face each other in the elastic portion 46. Specifically, the facing surface 48 and the attachment surface 49 face each other in the axial direction D1. The facing surface 48 faces the contact surface 36. The attachment surface 49 faces the base member 47. The attachment surface 49 comes into contact with the base member 47. The base member 47 is attached to the attachment surface 49.

As illustrated in FIG. 7, the elastic portion 46 includes one or more lips 50. The lip 50 protrudes from the facing surface 48. The lip 50 extends toward the contact surface 36. The lip 50 comes into contact with the contact surface 36. With the lip 50 coming into contact with the contact surface 36, the rotary valve 32 and the housing 31 are sealed.

The lip 50 includes a first lip 51. The first lip 51 extends in an arc shape about the rotation axis A1. The lip 50 includes a second lip 52. The second lip 52 extends in an annular shape about the rotation axis A1. The lip 50 includes a third lip 53. The third lip 53 extends in an annular shape about the rotation axis A1. The first lip 51, the second lip 52, and the third lip 53 are concentrically aligned about the rotation axis A1. The first lip 51, the second lip 52, and the third lip 53 are arranged in this order from an inner side to an outer side about the rotation axis A1.

The lip 50 includes a plurality of first coupling lips 54. The lip 50 includes, for example, two first coupling lips 54. The two first coupling lips 54 couple the first lip 51 and the second lip 52. The lip 50 includes a plurality of second coupling lips 55. The lip 50 includes, for example, two second coupling lips 55. The two second coupling lips 55 couple the second lip 52 and the third lip 53.

The first lip 51 and the two first coupling lips 54 divide a region surrounded by the second lip 52 into two. The two second coupling lips 55 divide the region between the second lip 52 and the third lip 53 into two.

The elastic portion 46 includes one or more recessed portions 56. The recessed portion 56 faces the contact surface 36. The recessed portion 56 is formed in the facing surface 48. Specifically, the lip 50 protrudes from the facing surface 48, thereby forming the recessed portion 56 in the elastic portion 46. That is, the recessed portion 56 is defined by the lip 50. The recessed portion 56 includes a first recessed portion 57 and a second recessed portion 58. The recessed portion 56 includes an open recessed portion 59.

The first recessed portion 57 is positioned at a position where the rotation axis A1 passes. The first recessed portion 57 is defined by the first lip 51, the second lip 52, and the two first coupling lips 54. A shape of the first recessed portion 57 is, for example, a fan shape when viewed from the axial direction D1.

The second recessed portion 58 is defined by the first lip 51, the second lip 52, and the two first coupling lips 54. A shape of the second recessed portion 58 is, for example, an arc shape when viewed from the axial direction D1.

The first recessed portion 57 and the second recessed portion 58 are the respective regions obtained by dividing the region surrounded by the second lip 52 into two by the first lip 51 and the plurality of first connecting lips 54.

The open recessed portion 59 is defined by the second lip 52, the third lip 53, and the two second coupling lips 55. A shape of the open recessed portion 59 is, for example, an arc shape when viewed from the axial direction D1.

As illustrated in FIG. 5, the first recessed portion 57 faces the first flow path 41. The first recessed portion 57 is positioned at a position overlapping the first flow path 41 when viewed from the axial direction D1. The first recessed portion 57 continually faces the first flow path 41 regardless of a rotational phase of the rotary valve 32. With the first recessed portion 57 facing the first flow path 41, the suction pipe 25 communicates with the first recessed portion 57. Accordingly, the suction pump 22 suctions the first recessed portion 57.

The first recessed portion 57 is positioned so as to be capable of facing the second flow path 42. The first recessed portion 57 is positioned at a position that can overlap the second flow path 42 when viewed from the axial direction D1. Depending on the rotational phase of the rotary valve 32, the first recessed portion 57 faces or does not face the second flow path 42. With the first recessed portion 57 facing the second flow path 42, the suction pipe 25 communicates with the first recessed portion 57. Accordingly, the suction pump 22 suctions the interior of the cap 21 through the first recessed portion 57.

The first recessed portion 57 is positioned so as to be capable of facing the third flow path 43. The first recessed portion 57 is positioned at a position that can overlap the third flow path 43 when viewed from the axial direction D1. Depending on the rotational phase of the rotary valve 32, the first recessed portion 57 faces or does not face the third flow path 43. With the first recessed portion 57 facing the third flow path 43, the exhaust pipe 26 communicates with the first recessed portion 57. Accordingly, the suction pump 22 suctions the interior of the supply flow path 17 through the first recessed portion 57.

In the flow path switching unit 24, a shape of the first recessed portion 57, a position of the second flow path 42, a position of the third flow path 43, and the like are taken into consideration so as to ensure that the first recessed portion 57 does not face both the second flow path 42 and the third flow path 43 simultaneously. That is, when the first recessed portion 57 faces the second flow path 42, the first recessed portion 57 does not face the third flow path 43. When the first recessed portion 57 faces the third flow path 43, the first recessed portion 57 does not face the second flow path 42. The rotation of the rotary valve 32 switches the flow path facing the first recessed portion 57 between the second flow path 42 and the third flow path 43. The first recessed portion 57, by the rotation of the rotary valve 32, is switched between a state of facing the first flow path 41 and the second flow path 42 and a state of facing the first flow path 41 and the third flow path 43.

The second recessed portion 58 is positioned so as to be capable of facing the second flow path 42. The second recessed portion 58 is positioned at a position that can overlap the second flow path 42 when viewed from the axial direction D1. Depending on the rotational phase of the rotary valve 32, the second recessed portion 58 faces or does not face the second flow path 42. When the second recessed portion 58 faces the second flow path 42, suction by the suction pump 22 is not applied to the suction pipe 25. That is, the suction pipe 25 is closed. The second recessed portion 58 faces the second flow path 42 when, for example, the first flow path 41 and the third flow path 43 face the first recessed portion 57.

The second recessed portion 58 is positioned so as to be capable of facing the third flow path 43. The second recessed portion 58 is positioned at a position that can overlap the third flow path 43 when viewed from the axial direction D1. Depending on the rotational phase of the rotary valve 32, the second recessed portion 58 faces or does not face the third flow path 43. When the second recessed portion 58 faces the third flow path 43, suction by the suction pump 22 is not applied to the exhaust pipe 26. The second recessed portion 58 faces the third flow path 43 when, for example, the first flow path 41 and the second flow path 42 face the first recessed portion 57.

The open recessed portion 59 is positioned so as to be capable of facing the fourth flow path 44. The open recessed portion 59 is positioned at a position that can overlap the fourth flow path 44 when viewed from the axial direction D1. Depending on the rotational phase of the rotary valve 32, the open recessed portion 59 faces or does not face the fourth flow path 44.

A through-hole 60 opens to the open recessed portion 59. The through-hole 60 passes through the elastic portion 46. Accordingly, the open recessed portion 59 communicates with the atmosphere. With the open recessed portion 59 facing the fourth flow path 44, the open pipe 27 communicates with the open recessed portion 59. As a result, the open pipe 27 communicates with the atmosphere. Accordingly, the interior of the cap 21 is opened to the atmosphere through the open pipe 27. When the open recessed portion 59 does not face the fourth flow path 44, the open pipe 27 is closed.

Figure 8:
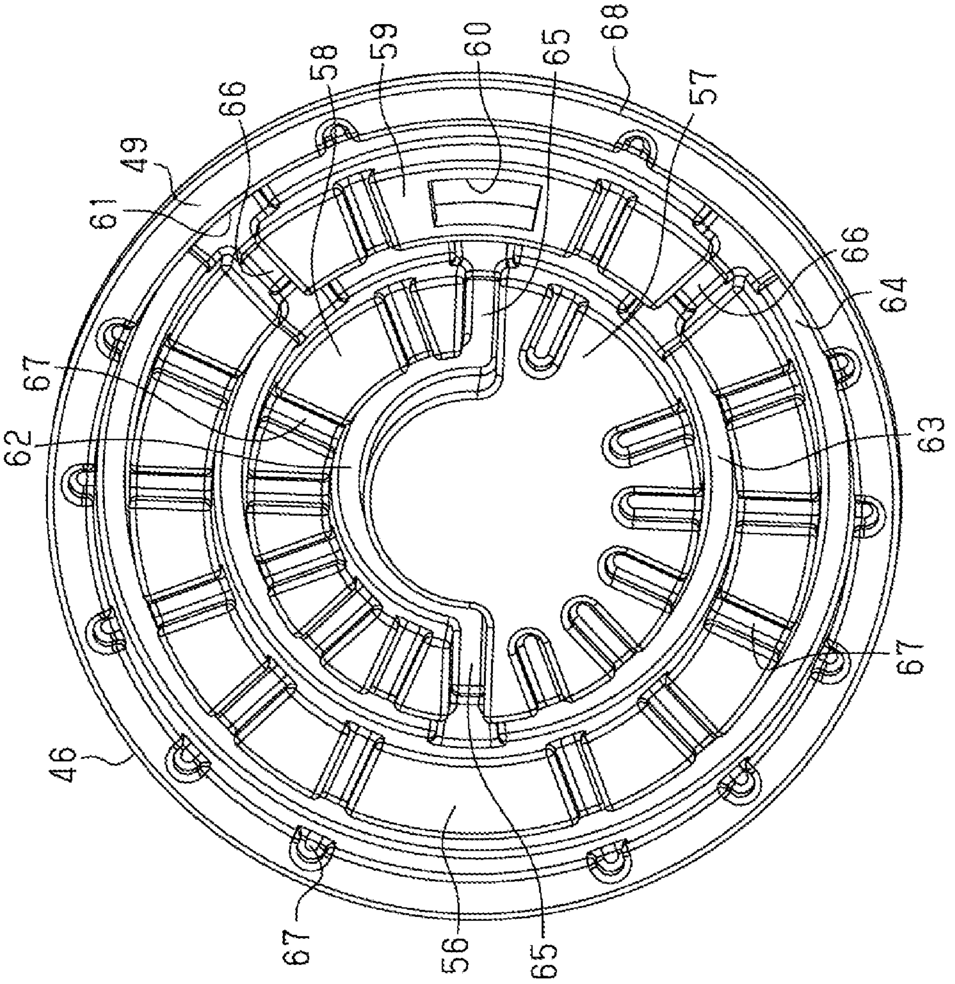
FIG. 8 is a perspective view of the elastic portion.

As illustrated in FIGS. 6 and 8, the elastic portion 46 includes one or more insertion grooves 61. The insertion groove 61 is a groove recessed from the attachment surface 49. The insertion groove 61 extends correspondingly with the lip 50. Accordingly, the insertion groove 61 extends so as to avoid a location where the recessed portion 56 is positioned. The insertion groove 61 overlaps the lip 50 in the axial direction D1. The insertion groove 61 is recessed toward an interior of the lip 50. The base member 47 is inserted into the insertion groove 61.

The insertion groove 61 includes a first insertion groove 62, and the first insertion groove 62 is a groove corresponding to the first lip 51. The first insertion groove 62 extends in an arc shape about the rotation axis A1. The insertion groove 61 includes a second insertion groove 63. The second insertion groove 63 corresponds to the second lip 52. The second insertion groove 63 extends in an annular shape about the rotation axis A1. The insertion groove 61 includes a third insertion groove 64. The third insertion groove 64 corresponds to the third lip 53. The third insertion groove 64 extends in an annular shape about the rotation axis A1. The insertion groove 61 includes a plurality of first coupling insertion grooves 65. The insertion groove 61 includes, for example, two first coupling insertion grooves 65. The first coupling insertion groove 65 corresponds to the first coupling lip 54. The first coupling insertion groove 65 couples the first insertion groove 62 and the second insertion groove 63. The insertion groove 61 includes a plurality of second coupling insertion grooves 66. The insertion groove 61 includes, for example, two second coupling insertion grooves 66. The second coupling insertion groove 66 corresponds to the second coupling lip 55. The second coupling insertion groove 66 couples the second insertion groove 63 and the third insertion groove 64.

The elastic portion 46 includes a plurality of rib grooves 67. The rib groove 67 is a groove recessed from the attachment surface 49. The base member 47 is inserted into the rib groove 67. The rib groove 67 extends radially about the rotation axis A1. The rib groove 67 intersects the second insertion groove 63 and the third insertion groove 64, for example. The rib groove 67 extends across the location where the recessed portion 56 is positioned. A depth of the rib groove 67 is less than a depth of the insertion groove 61. The depth of the rib groove 67 is a length from the attachment surface 49 to a bottom of the rib groove 67. The depth of the insertion groove 61 is a length from the attachment surface 49 to a bottom of the insertion groove 61.

The elastic portion 46 includes a protruding portion 68. The protruding portion 68 protrudes from the attachment surface 49 toward the base member 47. The protruding portion 68 is positioned about the axis of rotation A1, outward of the recessed portion 56. Specifically, the protruding portion 68 is positioned about the axis of rotation A1, outward of the rib groove 67. The protruding portion 68 is positioned on an outer peripheral portion of the elastic portion 46. The protruding portion 68 is positioned, for example, on an outermost edge of the elastic portion 46 when viewed from the axial direction D1. The protruding portion 68 extends in an annular shape, for example, when viewed from the axial direction D1.

As illustrated in FIG. 6, the base member 47 supports the elastic portion 46. The base member 47 integrally rotates with the elastic portion 46. The rotation of the base member 47 rotates the elastic portion 46. The base member 47 is, for example, disk-shaped.

The base member 47 includes a support face 70. The support face 70 faces the attachment surface 49. The support face 70 comes into contact with the attachment surface 49. The base member 47 comes into contact with the pressing member 33. Specifically, the surface of the base member 47 facing the support face 70 comes into contact with the pressing member 33.

Figure 9:
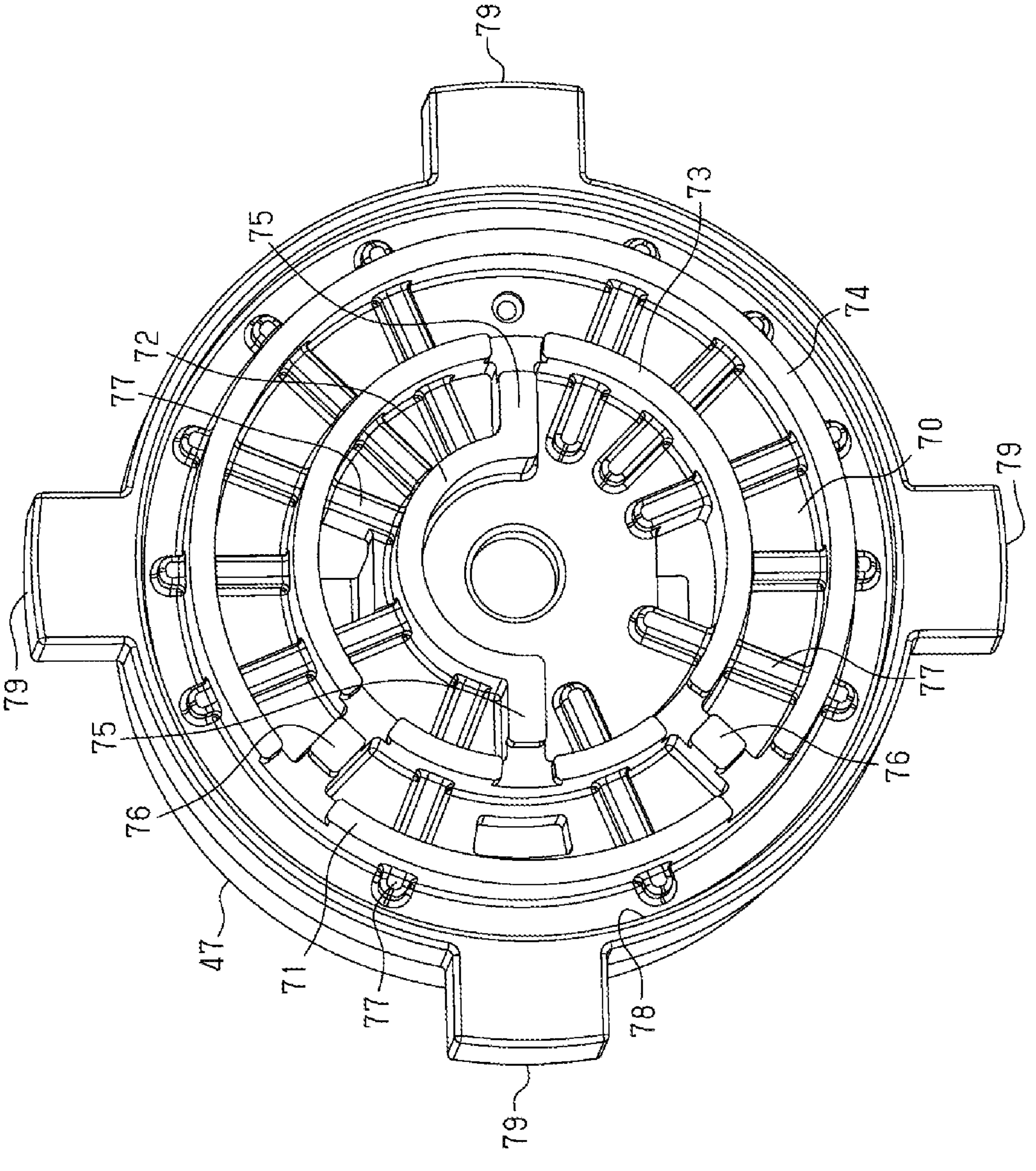
FIG. 9 is a perspective view of a base member.

As illustrated in FIGS. 6 and 9, the base member 47 includes one or more insertion portions 71. The insertion portion 71 extends from the support face 70. The insertion portion 71 protrudes toward the elastic portion 46. The insertion portion 71 is inserted into the elastic portion 46. Specifically, the insertion portion 71 is inserted into the insertion groove 61. The insertion portion 71 is inserted into the insertion groove 61, thereby bringing the support face 70 into contact with the attachment surface 49. The insertion portion 71 supports the lip 50 by being inserted into the insertion groove 61.

The insertion portion 71 includes a first insertion portion 72. The first insertion portion 72 is inserted into the first insertion groove 62. The first insertion portion 72 extends in an arc shape about the rotation axis A1. The insertion portion 71 includes a second insertion portion 73. The second insertion portion 73 is inserted into the second insertion groove 63. The second insertion portion 73 extends in an annular shape about the rotation axis A1. The insertion portion 71 includes a third insertion portion 74. The third insertion portion 74 is inserted into the third insertion groove 64. The third insertion portion 74 extends in an annular shape about the rotation axis A1. The insertion portion 71 includes a plurality of fourth insertion portions 75. The insertion portion 71 includes, for example, two fourth insertion portions 75. The two fourth insert portions 75 are inserted into the two first coupling insertion grooves 65, respectively. The insertion portion 71 includes a plurality of fifth insertion portions 76. The insertion portion 71 includes, for example, two fifth insertion portions 76. The two fifth insertion portions 76 are inserted into the two second coupling insertion grooves 66, respectively.

A length of the insertion portion 71 is less than the depth of the insertion groove 61. The length of the insertion portion 71 is a length from a base end of the insertion portion 71, that is, the support face 70, to a tip end of the insertion portion 71. The length of the insertion portion 71 is a dimension of the insertion portion 71 in the axial direction D1. With the length of the insertion portion 71 being less than the depth of the insertion groove 61, a gap is formed between the tip end of the insertion portion 71 and the bottom of the insertion groove 61. With this gap, the lip 50 readily flexes when the lip 50 comes into contact with the contact surface 36. As a result, the lip 50 readily flexes in accordance with the contact surface 36. Accordingly, the lip 50 readily comes into close contact with the housing 31.

The base member 47 includes a plurality of ribs 77. The rib 77 protrudes from the support face 70. The rib 77 extends toward the elastic portion 46. A length of the rib 77 is less than the length of the insertion portion 71. The length of the rib 77 is a length from a base end of the rib 77, that is, the support face 70, to a tip end of the rib 77. The length of the rib 77 is a dimension of the rib 77 in the axial direction D1.

The plurality of ribs 77 extend radially about the rotation axis A1. The rib 77 extends so as to pass through the insertion portion 71, for example. The plurality of ribs 77 are respectively inserted into the plurality of rib grooves 67. As a result, the base member 47 and the elastic portion 46 can be integrally rotated.

A friction force between the elastic portion 46 and the housing 31 acts on a tip end of the lip 50. Therefore, the base member 47 is preferably supported at a location near the tip end of the lip 50 by the rib 77. In contrast, in this example, the base member 47 supports a position of the lip 50 away from the tip end of the lip 50 such as, for example, a location that is the base end of the lip 50, by the rib 77.

When a location near the tip end of the lip 50 is supported by the rib 77, the rib groove 67 is positioned inside the lip 50. In this case, a thickness of the lip 50 may be uneven. When the thickness of the lip 50 is uneven, it is difficult to bring the lip 50 into contact with the contact surface 36 at a uniform pressure. Therefore, sealing properties between the rotary valve 32 and the housing 31 may deteriorate. Accordingly, in this example, the thickness of the lip 50 is made uniform by the location of the base end of the lip 50 being supported by the rib 77.

The base member 47 includes a support portion 78. The support portion 78 is positioned about the axis of rotation A1, outward of the insertion portion 71. The support portion 78 is positioned on an outer edge of the base member 47 when viewed from the axial direction D1, for example.

The support portion 78 supports the protruding portion 68. The support portion 78 includes a groove into which the protruding portion 68 is inserted. The support portion 78 supports the protruding portion 68 about the rotation axis A1 from an outer side. The support portion 78, for example, surrounds the protruding portion 68. Thus, the risk of the elastic portion 46 deforming and thus spreading outward about the axis of rotation A1 is reduced. As a result, the sealing properties between the rotary valve 32 and the housing 31 are less likely to deteriorate.

The base member 47 includes one or more protrusions 79. The base member 47 includes, for example, four protrusions 79. The four protrusions 79 protrude radially from an outer peripheral surface of the base member 47. The four protrusions 79 are positioned, for example, at positions respectively point-symmetrical with respect to the axial direction D1.

As illustrated in FIG. 6, the pressing member 33 comes into contact with the toothed drive gear 34 and the rotary valve 32. Specifically, the pressing member 33 comes into contact with the toothed drive gear 34 and the base member 47. The pressing member 33 presses the rotary valve 32 against the contact surface 36. Specifically, the pressing member 33 presses the base member 47 against the elastic portion 46. As a result, the elastic portion 46 is pressed against the contact surface 36. The pressing member 33 is, for example, a spring.

As illustrated in FIG. 3, the toothed drive gear 34 has a toothed gear portion 81 and a holding portion 82. The toothed gear portion 81 is rotated by a drive source, such as, for example, a motor. When the toothed gear portion 81 rotates, the holding portion 82 rotates along with the toothed gear portion 81. The holding portion 82 includes one or more holding grooves 83. The holding portion 82 includes, for example, four holding grooves 83. The protrusion 79 is inserted into the holding groove 83. Thus, the holding portion 82 holds the rotary valve 32. When the holding portion 82 rotates, the base member 47 rotates. Accordingly, the toothed drive gear 34 rotates the rotary valve 32.

Next, the specific operation of the flow path switching unit 24 will be described. The flow path switching unit 24 switches the flow path in accordance with the maintenance by the maintenance unit 20. That is, the flow path switching unit 24 changes to a different switching pattern in accordance with the maintenance by the maintenance unit 20. In the flow path switching unit 24, for example, the switching pattern is determined by the rotational phase of the rotary valve 32. In this example, there are five switching patterns. The rotational phase of the rotary valve 32 changes in accordance with the maintenance by the maintenance unit 20.

Figure 10:
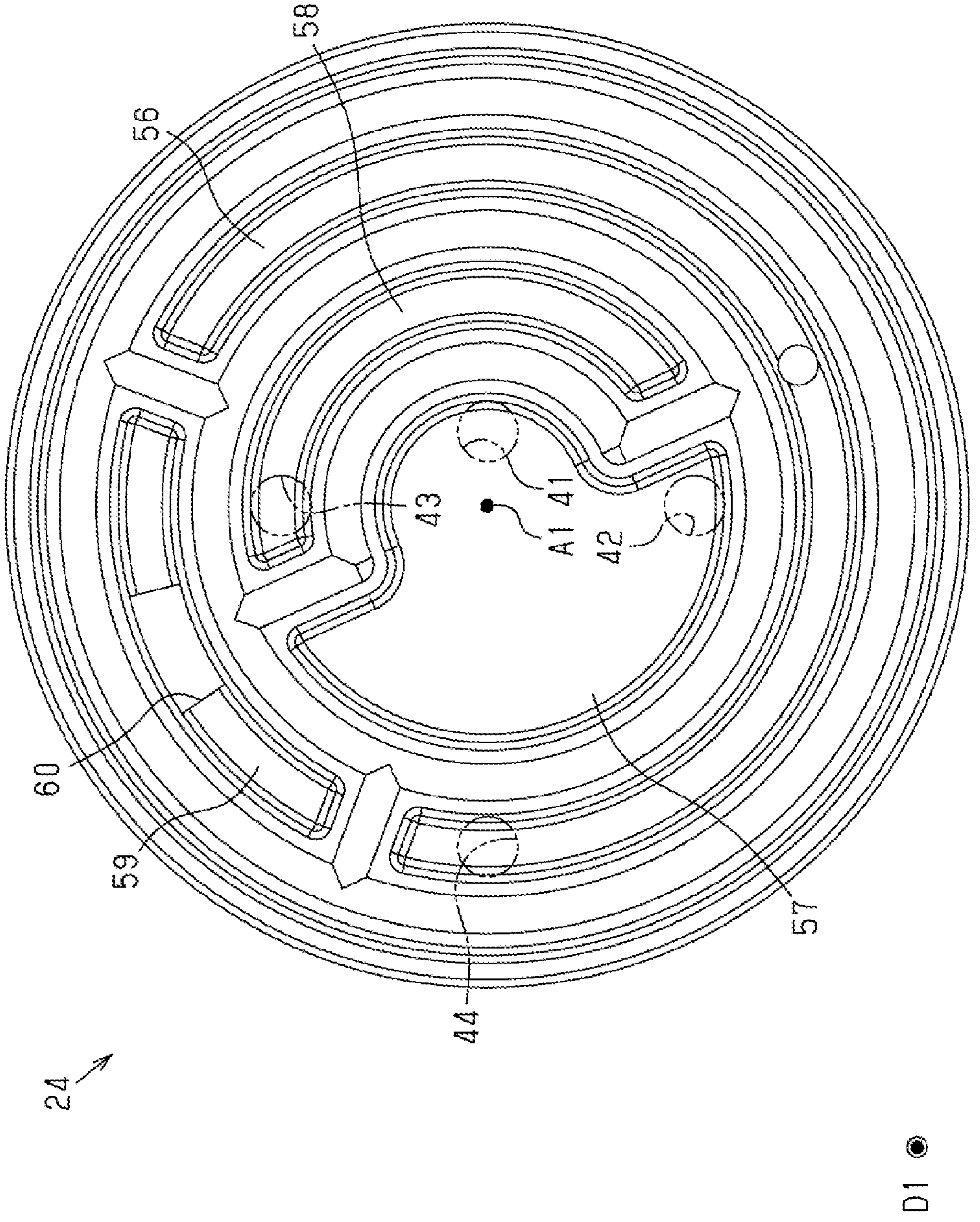
FIG. 10 is a front view of the flow path switching unit in a first switching pattern.

As illustrated in FIG. 10, in a first switching pattern, the first flow path 41 and the second flow path 42 face the first recessed portion 57. The third flow path 43 faces the second recessed portion 58. The fourth flow path 44 does not face the open recessed portion 59. In the first switching pattern, the suction pump 22 communicates with the interior of the cap 21.

The flow path switching unit 24 changes to the first switching pattern when the maintenance unit 20 is to clean the head 12. In the first switching pattern, the cap 21 comes into contact with the head 12. When the flow path switching unit 24 is in the first switching pattern, the rotational phase of the rotary valve 32 is, for example, 0 degrees.

Figure 11:
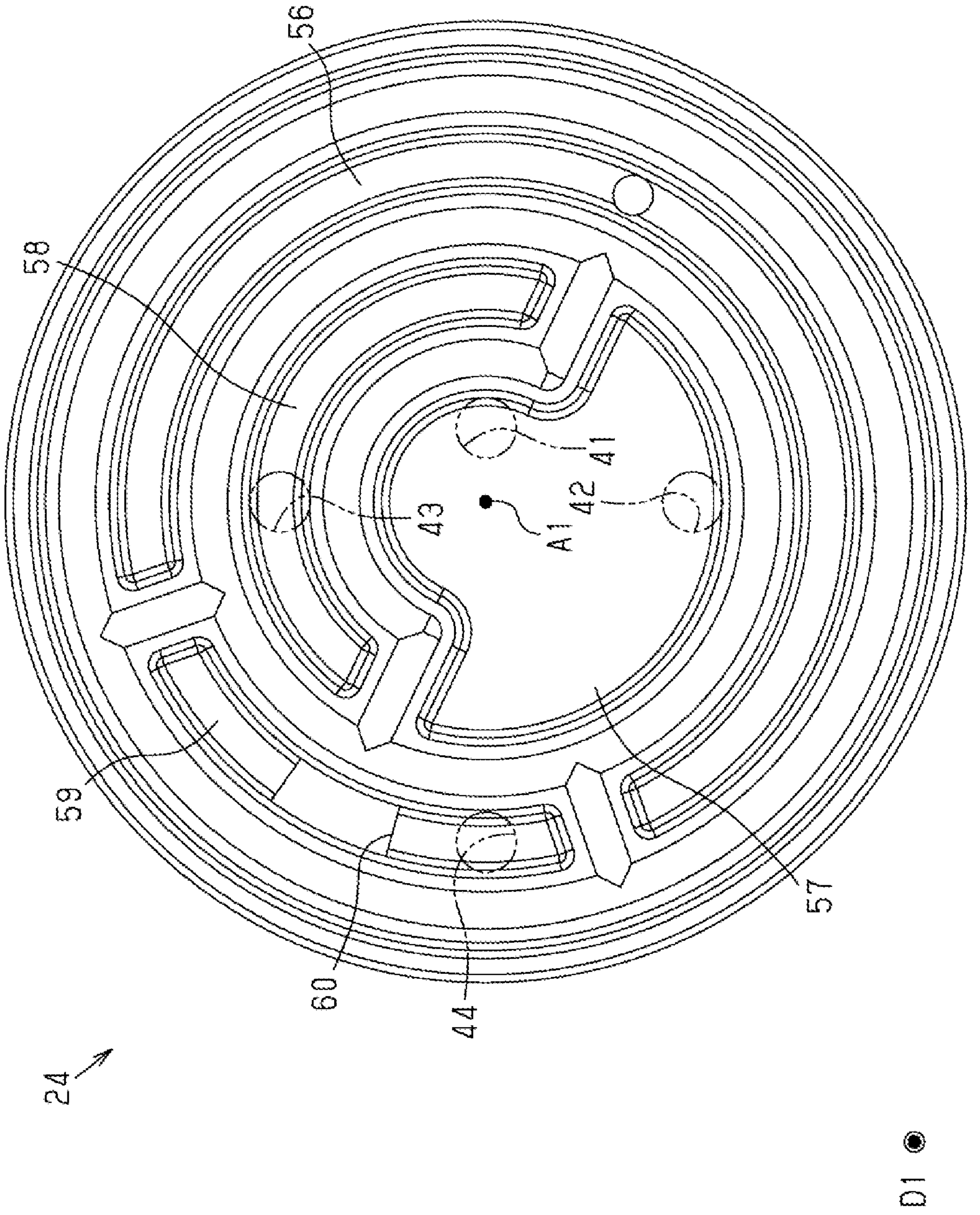
FIG. 11 is a front view of the flow path switching unit in a second switching pattern.

As illustrated in FIG. 11, in a second switching pattern, the first flow path 41 and the second flow path 42 face the first recessed portion 57. The third flow path 43 faces the second recessed portion 58. The fourth flow path 44 faces the open recessed portion 59. In the second switching pattern, the suction pump 22 communicates with the interior of the cap 21, and the interior of the cap 21 communicates with the atmosphere.

The flow path switching unit 24 changes to the second switching pattern when the maintenance unit 20 is to execute the idle suction of the interior of the cap 21. In the second switching pattern, the cap 21 comes into contact with the head 12. When the flow path switching unit 24 is in the second switching pattern, the rotational phase of the rotary valve 32 is, for example, 45 degrees.

Figure 12:
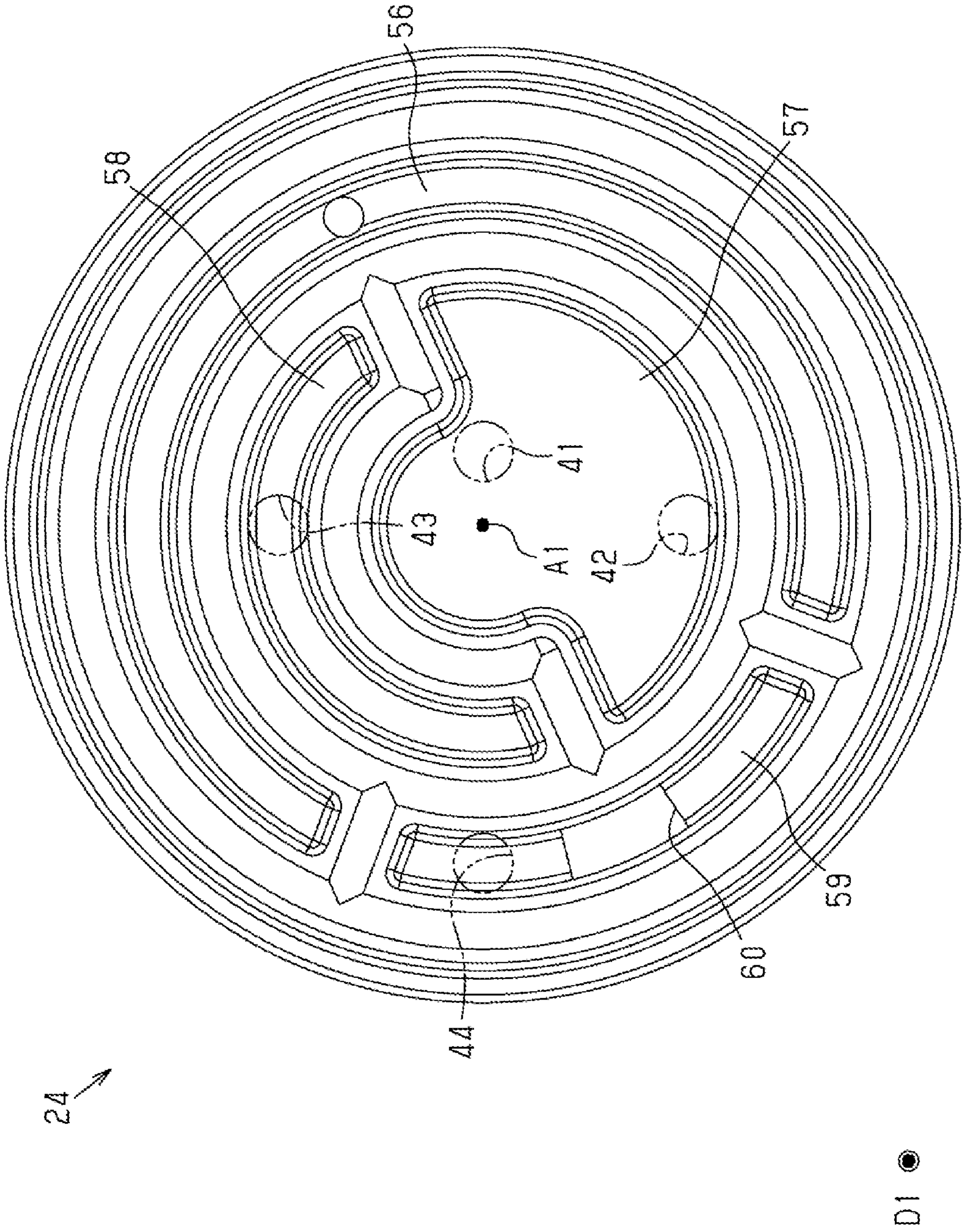
FIG. 12 is a front view of the flow path switching unit in a third switching pattern.

As illustrated in FIG. 12, in a third switching pattern, the first flow path 41 and the second flow path 42 face the first recessed portion 57. The third flow path 43 faces the second recessed portion 58. The fourth flow path 44 faces the open recessed portion 59. In the third switching pattern, similarly to the second switching pattern, the suction pump 22 communicates with the interior of the cap 21, and the interior of the cap 21 communicates with the atmosphere.

The flow path switching unit 24 changes to the third switching pattern when the maintenance unit 20 is to wipe the head 12. In the third switching pattern, the wiper 30 is positioned at a position that allows contact with the head 12. In the third switching pattern, the cap 21 is positioned at a position that does not come into contact with the head 12. In the third switching pattern, the idle suction is implemented simultaneously with the wiping. When the flow path switching unit 24 is in the third switching pattern, the rotational phase of the rotary valve 32 is, for example, 90 degrees.

Figure 13:
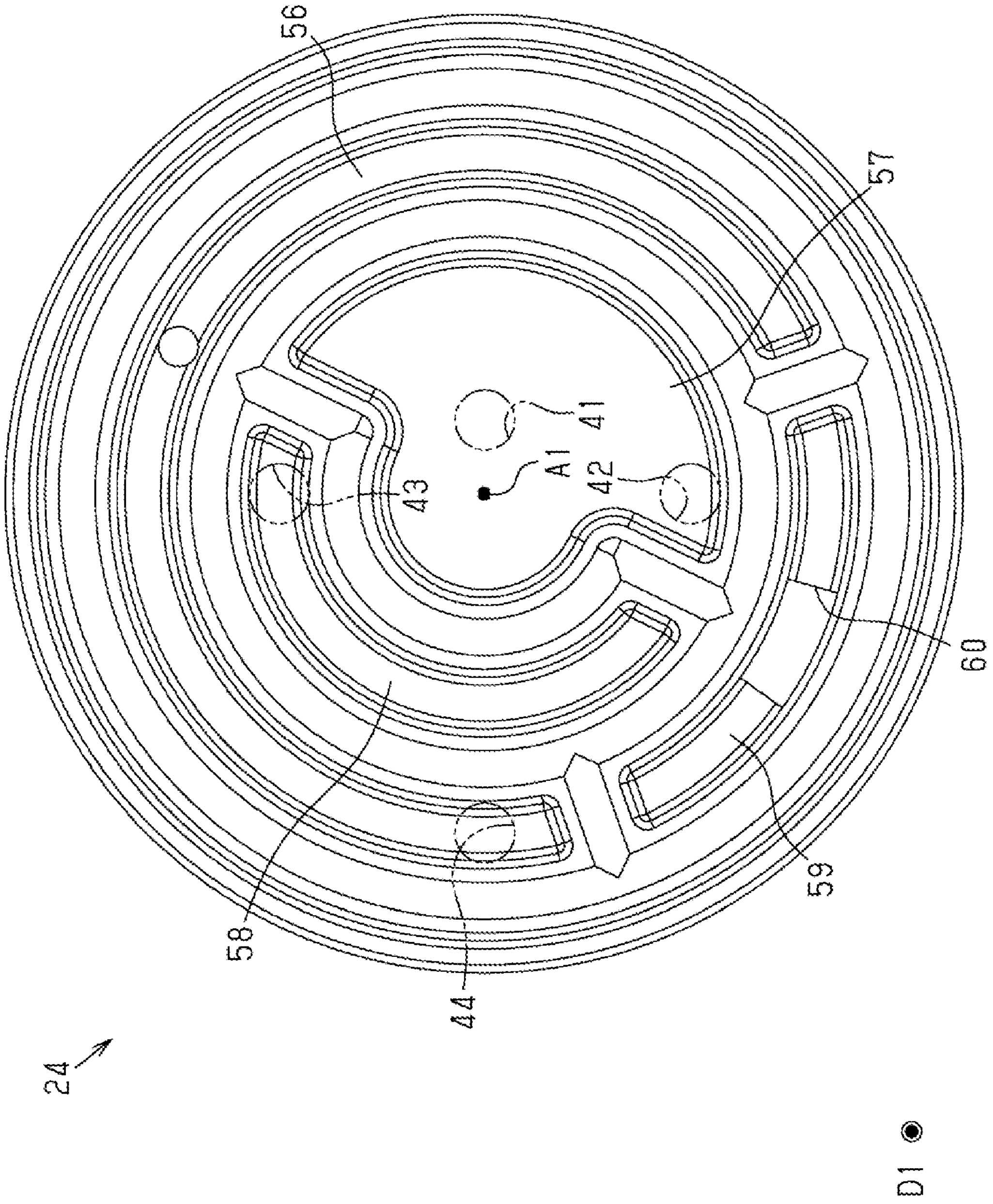
FIG. 13 is a front view of the flow path switching unit in a fourth switching pattern.

As illustrated in FIG. 13, in a fourth switching pattern, the first flow path 41 and the second flow path 42 face the first recessed portion 57. The third flow path 43 faces the second recessed portion 58. The fourth flow path 44 does not face the open recessed portion 59. In the fourth switching pattern, similarly to the first switching pattern, the suction pump 22 communicates with the interior of the cap 21.

The flow path switching unit 24 changes to the fourth switching pattern when the maintenance unit 20 completes the wiping of the head 12. In the fourth switching pattern, the wiper 30 is positioned at a position that does not come into contact with the head 12. In the fourth switching pattern, the cap 21 is positioned at a position that does not come into contact with the head 12. Therefore, in the fourth switching pattern, the idle suction is implemented. When the flow path switching unit 24 is in the fourth switching pattern, the rotational phase of the rotary valve 32 is, for example, 135 degrees.

The maintenance unit 20 implements maintenance in the order of cleaning, idle suction, and wiping by the flow path switching unit 24 being changed to the first switching pattern, the second switching pattern, the third switching pattern, and the fourth switching pattern, in this order, for example.

Figure 14:
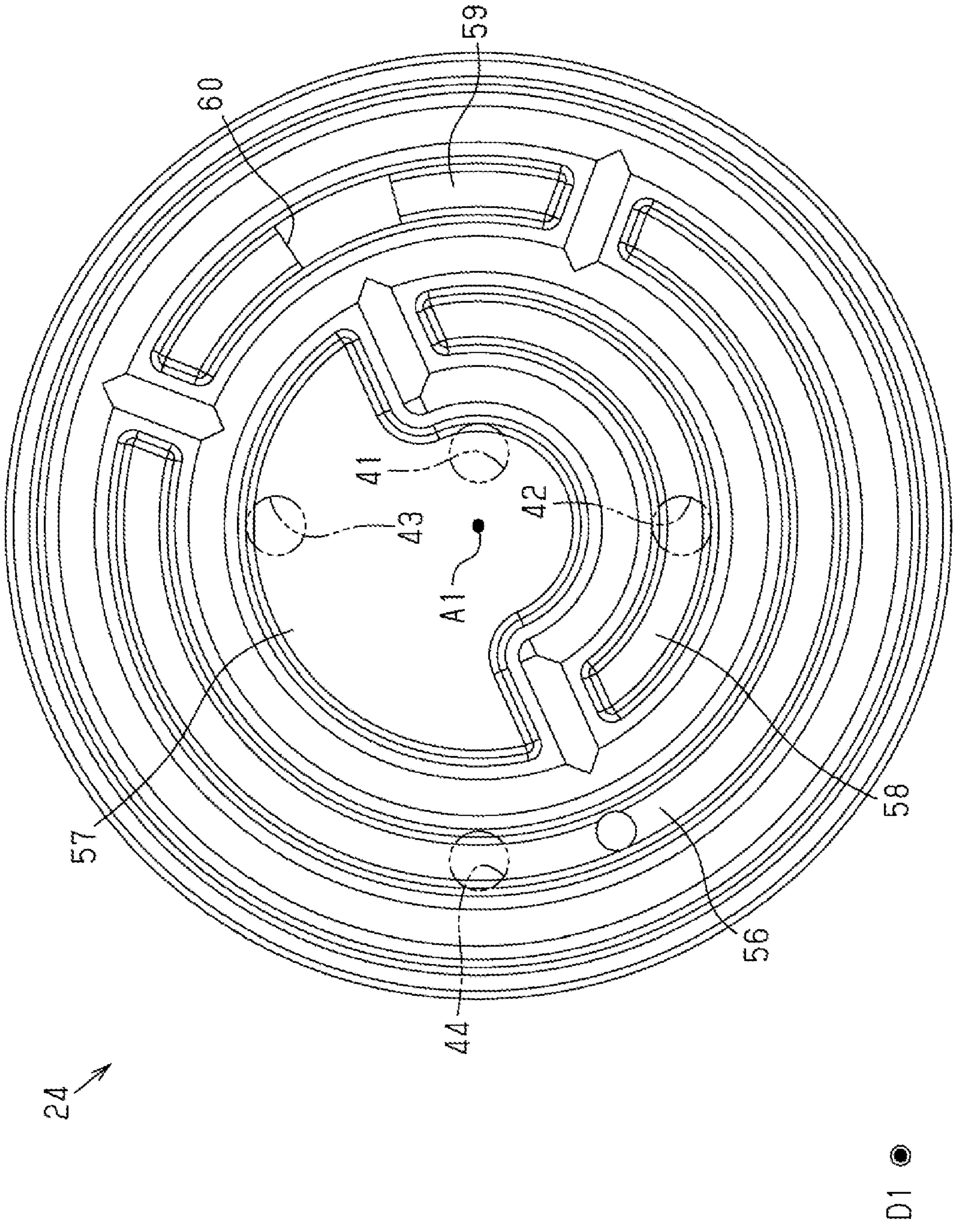
FIG. 14 is a front view of the flow path switching unit in a fifth switching pattern.

As illustrated in FIG. 14, in a fifth switching pattern, the first flow path 41 and the third flow path 43 face the first recessed portion 57. The second flow path 42 faces the second recessed portion 58. The fourth flow path 44 does not face the open recessed portion 59. In the fifth switching pattern, the suction pump 22 communicates with the supply flow path 17.

The flow path switching unit 24 changes to the fifth switching pattern when the maintenance unit 20 is to discharge air bubbles that are in the supply flow path 17. In the fifth switching pattern, the cap 21 may come into contact with or may not come into contact with the head 12. When the flow path switching unit 24 is in the fifth switching pattern, the rotational phase of the rotary valve 32 is, for example, 270 degrees.

Next, the functions and effects of the exemplary embodiment described above will be described.

(1) The flow path switching unit 24 includes the rotary valve 32 configured to rotate, the housing 31 including the contact surface 36 with which the rotary valve 32 comes into contact, and the pressing member 33 configured to press the rotary valve 32 against the contact surface 36. The housing 31 includes the first flow path 41 that opens to the contact surface 36, the second flow path 42 that opens to the contact surface 36, and the third flow path 43 that opens to the contact surface 36. The rotary valve 32 includes the elastic portion 46 configured to come into contact with the contact surface 36 and including the recessed portion 57 facing the contact surface 36. The first recessed portion 57 is configured to switch between a state of facing the first flow path 41 and the second flow path 42 and a state of facing the first flow path 41 and the third flow path 43 by the rotation of the rotary valve 32.

According to the configuration described above, even when the elastic portion 46 is worn, the pressing member 33 presses the rotary valve 32 against the contact surface 36, thereby maintaining contact between the elastic portion 46 and the contact surface 36. For example, even when the tip end of the lip 50 is worn, the elastic portion 46 is pressed against the contact surface 36 by the pressing member 33, thereby maintaining contact between the lip 50 and the contact surface 36. As a result, the sealing properties between the rotary valve 32 and the housing 31 are maintained. Accordingly, the flow path can be appropriately switched.

(2) The rotary valve 32 includes the base member 47 configured to support the elastic portion 46. The base member 47 comes into contact with the pressing member 33.

According to the configuration described above, the pressing force by the pressing member 33 uniformly acts on the elastic portion 46 as compared to a case in which the pressing member 33 directly presses the elastic portion 46. As a result, the sealing properties between the rotary valve 32 and the housing 31 are improved.

(3) The base member 47 includes the insertion portion 71 inserted into the elastic portion 46. The insertion portion 71 protrudes toward the elastic portion 46. The elastic portion 46 includes the insertion groove 61 into which the insertion portion 71 is inserted. The length of the insertion portion 71 is less than the depth of the insertion groove 61.

According to the configuration described above, a gap occurs between the tip end of the insertion portion 71 and the bottom of the insertion groove 61. As a result, the elastic portion 46 readily flexes. Specifically, the lip 50 readily flexes. The elastic portion 46 flexes in accordance with the contact surface 36, thereby improving the sealing properties between the rotary valve 32 and the housing 31.

(4) The base member 47 includes the plurality of ribs 77 extending radially about the rotation axis A1 of the rotary valve 32. The elastic portion 46 includes the plurality of rib grooves 67 into which the plurality of ribs 77 are respectively inserted. According to the configuration described above, when the rotary valve 32 rotates, the elastic portion 46 and the base member 47 are less likely to come off.

(5) The elastic portion 46 includes the protruding portion 68 protruding toward the base member 47. The protruding portion 68 is positioned about the rotation axis A1 of the rotary valve 32, outward of the recessed portion 56. The base member 47 includes the support portion 78 configured to support the protruding portion 68 about the rotation axis A1 from an outer side.

According to the configuration described above, the support portion 78 supports the protruding portion 68, reducing the risk of the elastic portion 46 flexing about the rotation axis A1 so as to spread outward. As a result, the sealing properties between the rotary valve 32 and the housing 31 are less likely to deteriorate. In particular, in this example, the lip 50 is pressed against the contact surface 36, thereby causing the elastic portion 46 to readily flex about the rotation axis A1 so as to spread outward. Therefore, the support portion 78 supports the protruding portion 68 from the outer side, making it possible for the lip 50 to appropriately come into contact with the contact surface 36.

(6) The elastic portion 46 includes the second recessed portion 58 facing the contact surface 36. The second recessed portion 58 faces the third flow path 43 when the first flow path 41 and the second flow path 42 face the first recessed portion 57. The second recessed portion 58 faces the second flow path 42 when the first flow path 41 and the third flow path 43 face the first recessed portion 57.

According to the configuration described above, when the first flow path 41 and the second flow path 42 are in communication, the third flow path 43 can be appropriately closed by the second recessed portion 58. When the first flow path 41 and the third flow path 43 are in communication, the second flow path 42 can be appropriately closed by the second recessed portion 58.

(7) The first flow path 41 is coupled to the suction pump 22. The second flow path 42 is coupled to the cap 21. The third flow path 43 is coupled to the supply flow path 17. According to the configuration described above, the flow path switching unit 24 can switch to a state in which the suction pump 22 and the cap 21 are coupled, and to a state in which the suction pump 22 and the supply flow path 17 are coupled.

The exemplary embodiment described above may be modified as follows. The exemplary embodiment and modified examples thereof described below may be implemented in combination within a range in which a technical contradiction does not arise.

The liquid discharged by the head 12 is not limited to ink, and may be, for example, a liquid material including particles of a functional material dispersed or mixed in liquid. For example, the head 12 may discharge a liquid material including a material such as an electrode material or a pixel material used in manufacture of a liquid crystal display, an electroluminescent display, and a surface emitting display in a dispersed or dissolved form.

Hereinafter, technical concepts and effects thereof that are understood from the above-described exemplary embodiment and modified examples will be described.

(A) A flow path switching unit includes a rotary valve configured to rotate, a housing including a contact surface with which the rotary valve comes into contact, and a pressing member configured to press the rotary valve against the contact surface. The housing includes a first flow path that opens to the contact surface, a second flow path that opens to the contact surface, and a third flow path that opens to the contact surface. The rotary valve includes an elastic portion configured to come into contact with the contact surface and including a recessed portion facing the contact surface, and the recessed portion is configured to switch between a state of facing the first flow path and the second flow path, and a state of facing the first flow path and the third flow path by rotation of the rotary valve.

According to the configuration described above, even when the elastic portion is worn, the pressing member presses the rotary valve against the contact surface, thereby maintaining contact between the elastic portion and the contact surface. As a result, the sealing properties between the rotary valve and the housing are maintained. Accordingly, the flow path can be appropriately switched.

(B) In the flow path switching unit described above, the rotary valve may include a base member configured to support the elastic portion and the base member may come into contact with the pressing member.

According to the configuration described above, the pressing force by the pressing member uniformly acts on the elastic portion as compared to a case in which the pressing member directly presses the elastic portion. As a result, the sealing properties between the rotary valve and the housing are improved.

(C) In the flow path switching unit described above, the base member may include an insertion portion configured to be inserted into the elastic portion and protruding toward the elastic portion, the elastic portion may include an insertion groove into which the insertion portion is inserted, and a length of the insertion portion may be less than a depth of the insertion groove.

According to the configuration described above, a gap occurs between the tip end of the insertion portion and the bottom of the insertion groove. As a result, the elastic portion readily flexes. The elastic portion flexes in accordance with the contact surface, thereby improving the sealing properties between the rotary valve and the housing.

(D) In the flow path switching unit described above, the base member may include a plurality of ribs extending radially about a rotation axis of the rotary valve and the elastic portion may include a plurality of rib grooves into which the plurality of ribs are respectively inserted. According to the configuration described above, when the rotary valve rotates, the elastic portion and the base member are less likely to come off.

(E) In the flow path switching unit described above, the elastic portion may include a protruding portion protruding toward the base member, the protruding portion may be positioned about a rotation axis of the rotary valve, outward of the recessed portion, and the base member may include a support portion configured to support the protruding portion about the rotation axis from an outer side.

According to the configuration described above, the support portion supports the protruding portion, reducing the risk of the elastic portion flexing about the rotation axis so as to spread outward. As a result, the sealing properties between the rotary valve and the housing 31 are less likely to deteriorate.

(F) In the flow path switching unit described above, the recessed portion may be a first recessed portion, the elastic portion may include a second recessed portion facing the contact surface, and the second recessed portion may face the third flow path when the first flow path and the second flow path face the first recessed portion and may face the second flow path when the first flow path and the third flow path face the first recessed portion.

According to the configuration described above, when the first flow path and the second flow path are in communication, the third flow path can be appropriately closed by the second recessed portion. When the first flow path and the third flow path are in communication, the second flow path can be appropriately closed by the second recessed portion.

(G) A liquid ejecting device includes a head including a nozzle configured to eject a liquid, a supply flow path for supplying the liquid from a supply source to the head, a cap configured to cover the nozzle by coming into contact with the head, a suction pump, and the flow path switching unit described above. The first flow path is coupled to the suction pump, the second flow path is coupled to the cap, and the third flow path is coupled to the supply flow path.

According to the configuration described above, an effect similar to that of the flow path switching unit described above can be obtained. Further, the flow path switching unit can switch the state to a state in which the suction pump and the cap are coupled, and to a state in which the suction pump and the supply flow path are coupled.

What is claimed is:

1. A flow path switching unit, comprising:
- a rotary valve configured to rotate around a rotation axis;
- a housing including a contact surface configured to come into contact with the rotary valve in a direction along the rotation axis; and
- a pressing member configured to press the rotary valve against the contact surface, wherein
- the housing includes
- a first flow path opening to the contact surface,
- a second flow path opening to the contact surface, and
- a third flow path opening to the contact surface,
- the rotary valve includes an elastic portion configured to come into contact with the contact surface and including a recessed portion facing the contact surface, and
- the rotary valve is configured to switch, by rotation of the rotary valve, between a state in which the recessed portion faces the first flow path and the second flow path and a state in which the recessed portion faces the first flow path and the third flow path.

2. The flow path switching unit according to claim 1, wherein
- the rotary valve includes a base member configured to support the elastic portion, and
- the base member comes into contact with the pressing member.

3. The flow path switching unit according to claim 2, wherein
- the base member includes an insertion portion configured to be inserted into the elastic portion and protruding toward the elastic portion,
- the elastic portion includes an insertion groove into which the insertion portion is inserted, and
- a length of the insertion portion is less than a depth of the insertion groove.

4. The flow path switching unit according to claim 2, wherein
- the base member includes a plurality of ribs extending radially about the rotation axis, and
- the elastic portion includes a plurality of rib grooves into which the plurality of ribs are respectively inserted.

5. The flow path switching unit according to claim 2, wherein
- the elastic portion includes a protruding portion protruding toward the base member,
- the protruding portion is positioned outward of the recessed portion about the rotation axis, and
- the base member includes a support portion configured to support the protruding portion from an outside of the protruding portion about the rotation axis.

6. The flow path switching unit according to claim 1, wherein
- the recessed portion is a first recessed portion,
- the elastic portion includes a second recessed portion facing the contact surface, and the second recessed portion
faces the third flow path when the first flow path and the second flow path face the first recessed portion and
faces the second flow path when the first flow path and the third flow path face the first recessed portion.

7. A liquid ejecting device comprising:
a head including a nozzle configured to eject a liquid;
a supply flow path configured to supply the liquid from a supply source to the head;
a cap configured to cover the nozzle by coming into contact with the head;
a suction pump; and
the flow path switching unit described in claim 1, wherein
the first flow path is coupled to the suction pump,
the second flow path is coupled to the cap, and
the third flow path is coupled to the supply flow path.

8. The flow path switching unit according to claim 1, wherein
the pressing member is configured to apply a spring force to press the rotary valve against the contact surface.

9. The flow path switching unit according to claim 1, wherein
the rotary valve includes a base member configured to support the elastic portion,
the base member includes a plurality of ribs extending radially about the rotation axis, and
the elastic portion includes a plurality of rib grooves into which the plurality of ribs are respectively inserted.

10. The flow path switching unit according to claim 1, wherein
the rotary valve includes a base member configured to support the elastic portion,
the elastic portion includes a protruding portion protruding toward the base member,
the protruding portion is positioned outward of the recessed portion about the rotation axis, and
the base member includes a support portion configured to support the protruding portion from an outside of the protruding portion about the rotation axis.

11. The flow path switching unit according to claim 3, wherein
the elastic portion includes
a facing surface configured to face the contact surface,
an attachment surface configured to face the facing surface in the direction along the rotation axis, and
a lip configured to protrude from the facing surface,
the insertion groove is a groove recessed from the attachment surface and configured to extend correspondingly with the lip.

12. The flow path switching unit according to claim 11, wherein
the recessed portion is formed in the facing surface and defined by the lip.

* * * * *